(12) United States Patent
Zelman

(10) Patent No.: US 7,441,889 B2
(45) Date of Patent: *Oct. 28, 2008

(54) AUXILIARY AND PRIMARY EYEWEAR WITH EASY RELEASE SNAP CONNECTION

(76) Inventor: Gary Martin Zelman, 997 Flower Glen Rd., Simi Valley, CA (US) 93065

( * ) Notice: Subject to any disclaimer, the term of this patent is extended or adjusted under 35 U.S.C. 154(b) by 220 days.

This patent is subject to a terminal disclaimer.

(21) Appl. No.: 11/423,937

(22) Filed: Jun. 13, 2006

(65) Prior Publication Data

US 2007/0258037 A1 Nov. 8, 2007

Related U.S. Application Data

(63) Continuation-in-part of application No. 11/418,036, filed on May 3, 2006, now Pat. No. 7,384,141.

(51) Int. Cl.
*G02C 7/08* (2006.01)

(52) U.S. Cl. ............................ 351/57; 351/47; 351/140
(58) Field of Classification Search .................. 351/47, 351/48, 57, 58, 140–152
See application file for complete search history.

(56) References Cited

U.S. PATENT DOCUMENTS

| | | | | |
|---|---|---|---|---|
| 5,367,742 | A | * 11/1994 | Bindman | 16/87.2 |
| 5,894,335 | A | * 4/1999 | Hoffman | 351/47 |
| 6,702,439 | B1 | 3/2004 | Lee | |
| 6,779,886 | B2 | 8/2004 | Huang | |

* cited by examiner

*Primary Examiner*—Huy K Mai
(74) *Attorney, Agent, or Firm*—Trojan Law Offices

(57) ABSTRACT

Eyeglasses having a lens frame removably attached to a primary eyewear using easy release snap connection that provides effective resistance from the lens frame from becoming involuntarily detached from the primary eyewear. This arrangement allows the user to maximize the different kinds of eyewear.

20 Claims, 14 Drawing Sheets

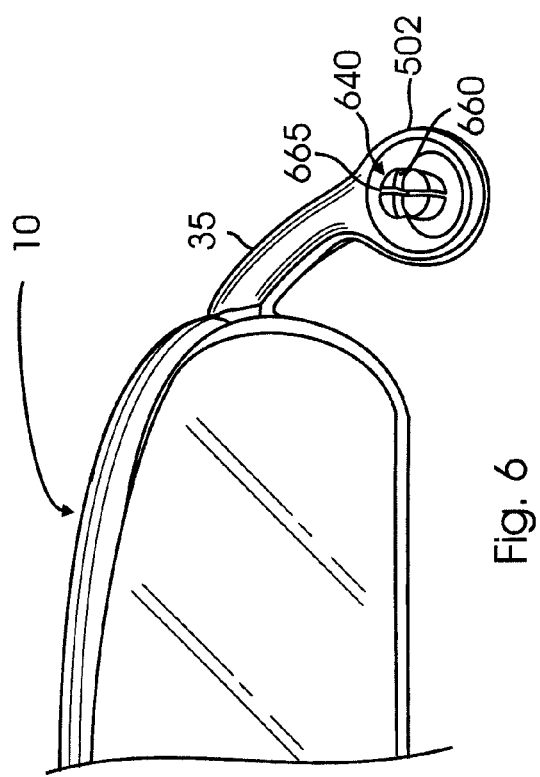
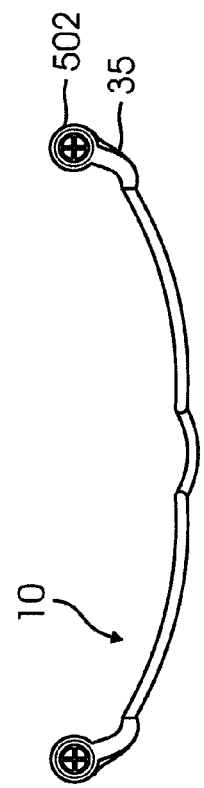
Fig. 6
Fig. 7

AUXILIARY AND PRIMARY EYEWEAR WITH EASY RELEASE SNAP CONNECTION

PRIORITY CLAIM

This is a continuation-in-part application of U.S. patent application Ser. No. 11/418,036, entitled "Auxiliary and Primary Eyewear with Easy Release Snap Connection," filed May 3, 2006 now U.S. Pat. No.7,384,141.

BACKGROUND OF THE INVENTION

1. Field of the Invention

This invention relates to eyewear and eyeglasses and a method of using said eyewear and eyeglasses, which provide a lens frame removably attached to a primary eyewear, such as an eyewear platform or conventional eyeglasses, with snap connections.

2. Background Information

Auxiliary eyewear attachments, which connect to primary or conventional eyeglasses with attachment devices, allow the user to convert a pair of conventional eyeglasses to sunglasses and to avoid the need for an additional pair of prescription sunglasses. This auxiliary eyewear can also be used to change the prescription of the lenses on the primary eyewear.

Another way to allow the user to maximize the different kinds of eyewear is for the user to attach a removable lens frame to an eyewear platform. By allowing removable attachment of the lens frame to an eyewear platform, the user only needs to wear one set of lenses at a time. By only using one set of lenses in this eyewear, there is reduced weight, no glare or reflection between lenses, and no distraction in the field of vision with the eyewear. In addition, since there is only one set of lenses, it is easier for the user to keep these lenses clean. Further, by using the same eyewear platform as a base to attach different lenses, the user is able to employ one eyewear apparatus that allows for multiple and different types of lenses and that can be changed easily and quickly. Finally, instead of having several different pairs of conventional glasses, the user may substantially save cost by having different sets of lenses for one eyewear platform.

A number of different designs are available for auxiliary eyewear using attachment devices such as magnets, clips, snaps, clasps, or hooks. A method of attaching auxiliary eyewear by snaps is shown and described in U.S. Pat. No. 6,196,679 B1 issued Mar. 6, 2001 to Edmund Wong. In the Wong patent, each of a pair of projections on the auxiliary frame engages and fits snugly in an opening on a corresponding projection on the primary spectacle frame. In order to allow the auxiliary projections to fit snugly in the openings, Wong uses an incomplete ring clip received and retained in an annular recess of the opening's inner surface.

A problem with the attachment device disclosed and described in Wong is that as a user repeatedly attaches and detaches the auxiliary eyewear, the incomplete ring clip can become loosened or worn out and lose its ability to secure locking engagement between the auxiliary projection and the primary projection. Further, manufacture of the eyeglasses with such incomplete ring clip inserted in the inner surface of the opening is relatively complex and requires separate pieces of material.

Moreover, the process of detachment of the auxiliary eyewear from the primary eyeglasses in Wong is inconvenient. In order to release the locking engagement between the auxiliary projection and the primary projection, a user has to forcibly pull the auxiliary projection from the primary projection. If the user tries to detach the auxiliary eyewear while wearing the assembly of the primary glasses and the auxiliary eyewear, pulling the auxiliary eyewear from the primary eyeglasses may cause severe dislocation of the primary eyeglasses, and may result in injury to the user's face.

It is, therefore, one object of the present invention to provide a new and improved snap connection for attaching auxiliary eyeglasses to a primary eyewear, which is stable and durable in its structure.

Another object of the present invention is to provide a method and apparatus of easy release snap connection that allows a user to comfortably and conveniently detach an auxiliary eyewear from a primary eyewear.

SUMMARY OF THE INVENTION

The purpose of the present invention is to provide an eyewear apparatus and a method that provides a lens frame removably attached to a primary eyewear, such as conventional eyeglasses or an eyewear platform, by snap connection that effectively prevents the removable lens frame from becoming involuntarily detached from the primary eyewear and that is conveniently and comfortably releasable.

In the present invention, an apparatus for attaching a lens frame to a primary eyewear comprises a first connector and a second connector. The first connector has a male portion, and the second connector has a female portion. The female portion can be located in each of temple extensions of a primary eyewear, and the male portion can be placed in proximity to each appendage of a lens frame for mating with the female portion. Alternatively, the male portion can be located in proximity to each temple extension of a primary eyewear, and the female portion can be placed in a corresponding location of a lens frame for receiving the male portion.

The first connector further comprises a button that is connected to each of appendages of the lens frame by a spring member. The male portion is attached to the button so that the male portion is movable with the button. The male portion comprises a body and a hook. The hook of the male portion protrudes from the body of the male portion.

Being configured to receive the male portion, the female portion is defined by an inner wall and a terminal edge of the second connector. The terminal edge protrudes from the inner wall of the second connector so that the part of the female portion defined by the terminal edge is narrower than the part of the female portion defined by the inner wall of the second connector.

In order to insert the male portion into the female portion, a user presses the button inward toward a lens of the lens frame. Upon pressing the button, the hook of the male portion passes the terminal edge, and, upon releasing the button, the male portion frictionally engages the terminal edge and/or the inner wall for securely locking the male portion in the female portion.

In order to release the male portion from the female portion, the user again presses the button to release the male portion from the engagement with the terminal edge and/or the inner wall.

The present invention introduces such refinement. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIG. 6 shows a male portion located in an appendage socket of the lens frame.

FIG. 7 is a top view of the lens frame with a male portion.

DETAILED DESCRIPTION OF THE INVENTION

Figure 1:
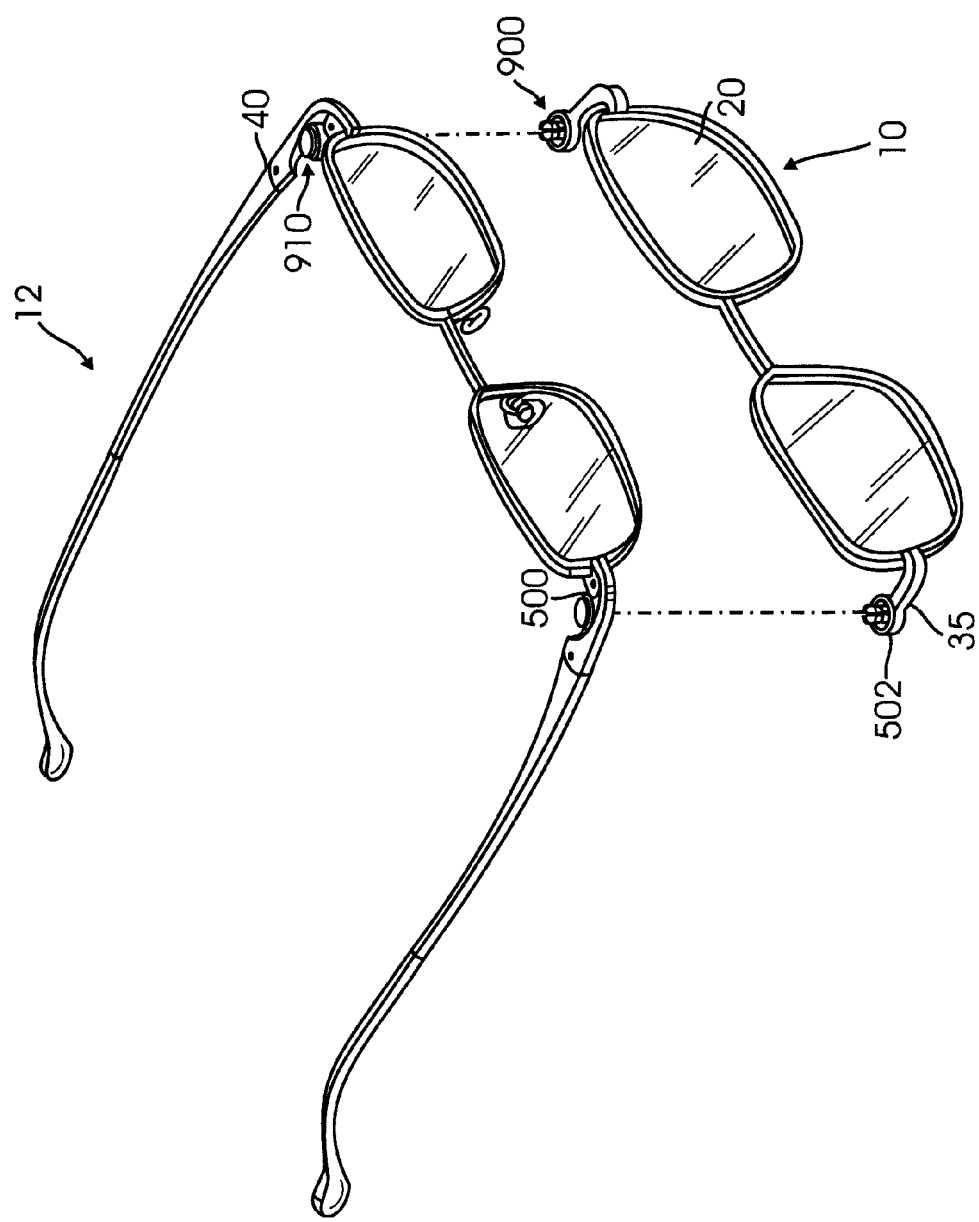
FIG. 1 is an exploded view of the first embodiment of a removable lens frame and conventional eyeglasses with easy release snap connections.

FIGS. 1 through 16B show embodiments of easy release snap connection for attaching a lens frame to a primary eyewear, such as conventional eyeglasses or an eyewear platform.

As shown in FIGS. 1 through 11, the present invention for attaching a lens frame to a primary eyewear comprises a first snap connector 900 and a second snap connector 910. The first snap connector 900 has a male portion 640, and the second snap connector has a female portion 630 that is an opening for receiving the male portion 640. The male portion 640 can be located in proximity to each temple extension 40 of a primary eyewear 12 or 15, and the female portion 630 can be placed in a corresponding location of a lens frame 10 for receiving the male portion 640. Alternatively, the female portion 630 can be located in proximity to each temple extension 40 of a primary eyewear 12 or 15, and the male portion 640 can be placed in a corresponding location of a lens frame 10 for mating with the female portion 630.

Figure 4:
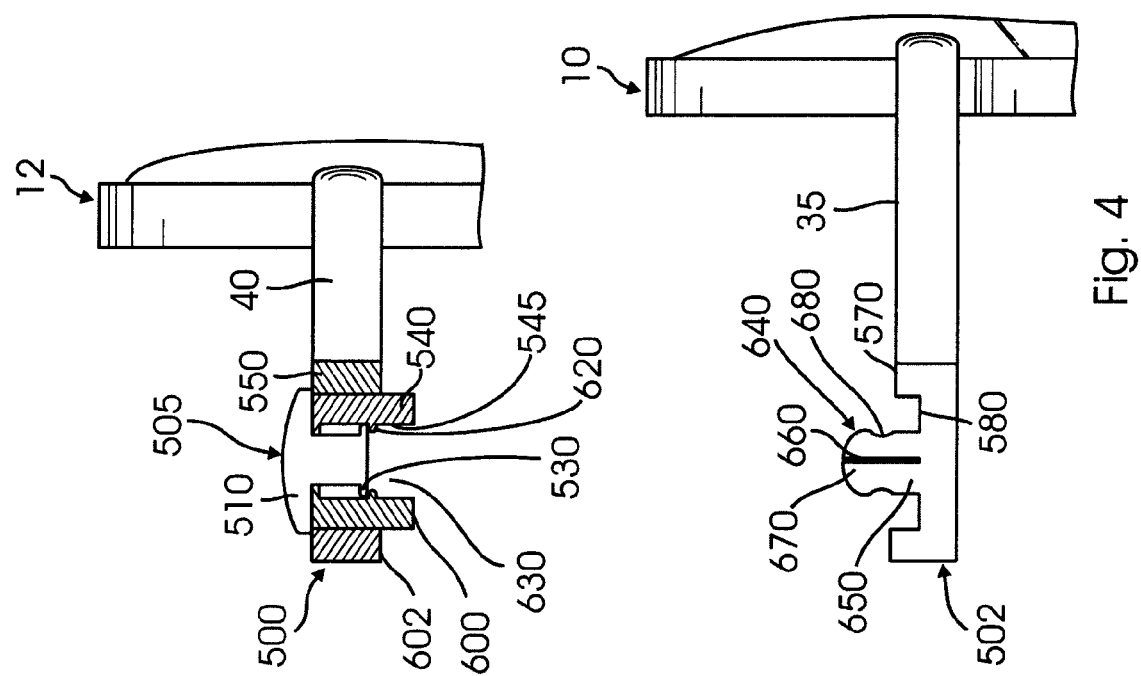
FIG. 4 is a partial cross-sectional side view illustrating the lens frame detached from the conventional eyeglasses.

For example, as shown in FIGS. 1 and 4, the female portion 630 can be located in a temple socket 500 that is attached to each temple extension 40 of a primary eyewear 12, for receiving the male portion 640 located in an appendage socket 502 of the lens frame 10. The female portion 630 is defined by an inner wall 540 that is surrounded by an outer wall 550. The inner wall 540 has a first ridge 610 and a second ridge 620 protruding from its inner surface 545. The first ridge 610 is located in proximity to an upper area of the inner wall 540, and the second ridge 620 is located in proximity to a mid area of the inner wall 540. The height of the inner wall 540 is greater than that of the outer wall 550 so that a first bottom surface 600 of the inner wall 540 is located lower than a second bottom surface 602 of the outer wall 550.

The second snap connector 910 further comprises a button 505 for comfortably releasing the engagement between the first snap connector 900 and the second snap connector 910. The button 505 comprises a cap 510 and a pillar 520, and is seated in the temple socket 500. The width of the pillar 520 is slightly smaller than that of an opening defined by the first ridge 610 so that the pillar 520 of the button 505 can slide in and out of the female portion 630. The movement of the button 505 is limited by a button ridge 530, which engages the first ridge 610 of the inner wall 540 so that the button 505 is not separated from the temple socket 500. The movement of the button 505 is also limited by the cap 510, which has a width greater than that of the opening defined by the first ridge 610 so that the cap 510 can sit on the top surface of the temple socket 500.

The male portion 640 located in the appendage socket 502 of the lens frame 10 comprises a body 650 and a head 670. Preferably, the male portion further comprises a recess 680 located between the body 650 and the head 670. As shown in FIGS. 6 and 7, the male portion 640 has at least one cut formed substantially along the length of the male portion 640 so that the head 670 is split into multiple segments. There is a space 665 between the segments, and the segments do not contact each other when the male portion 640 is not inserted into the female portion 630. The first surface 580 and the second surface 570 of the appendage socket 502 are proportioned to receive and fully engage the first bottom surface 600 and the second bottom surface 602 respectively of the temple socket 500.

As shown in FIG. 4, when the male portion 640 of the lens frame 10 is not inserted into the female portion 630 of the temple socket 500, the pillar 520 of the button 505 can be located substantially within the female portion 630, and the bottom surface of the cap 510 is substantially in contact with the top surface 590 of the temple socket 500.

Depending on the specific design or need of the user, the head of the male portion and corresponding female portion can be in any shape, including but not limited to, round, cylinder, rectangle, oval, and flat. The head and the body of the male portion can each have a different shape, or can have the same shape. For example, the head can be in a substantially round shape, and the body can be in a substantially cylinder shape. In another example, the head can be in a rectangular shape, and the body can be in a cylinder shape. In still another example, the head and the body together can comprise one piece of a cylinder shape.

Figure 3:
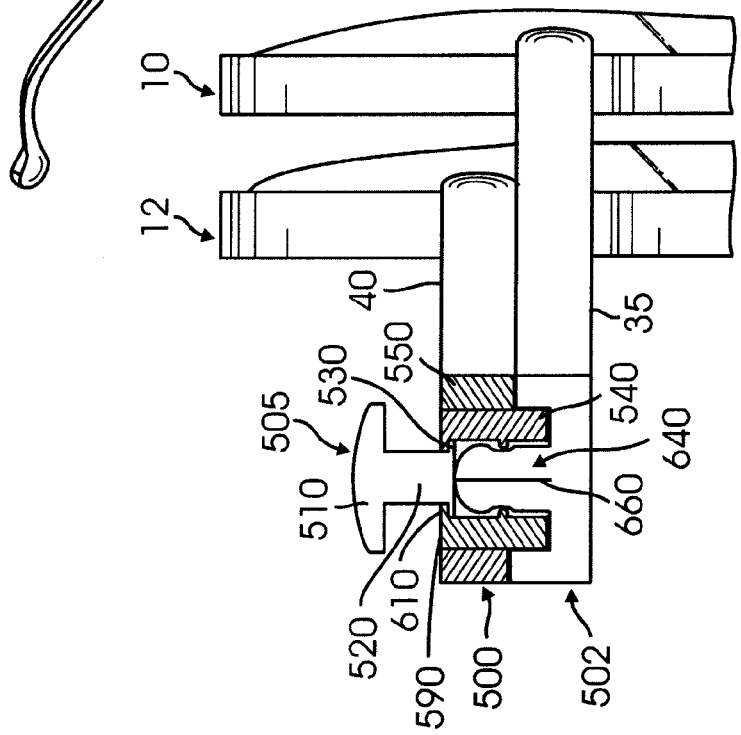
FIG. 3 is a partial cross-sectional view taken at 3-3 of FIG. 2.

Referring to FIG. 3, in order to attach the lens frame 10 to a primary eyewear 12, the male portion 640 of the lens frame 10 is inserted into the female portion 630 of the primary eyewear 12. The width of the head 670 is slightly larger than that of an opening portion defined by the second ridge 620 so that a user has to exercise slight force in order to allow the head 670 to be compressed by and pass the second ridge 620. The head 670 is compressible due to the space 665 made from the cut 660. Upon passing the second ridge 620, the head 670 returns to its approximate original width. In a preferred embodiment, the recess 680 of the male portion 640 is proportioned to engage the second ridge 620, thereby locking the male portion 640 in the female portion 630. In another embodiment, the male portion 640 does not have the recess, and the second ridge 620 can frictionally engage a part of the head 670 for locking the male portion 640 in the female portion 630.

Upon insertion of the male portion 640 into the female portion 630, a top surface area of the head 670 engages a bottom surface area of the button 505. Also, the first bottom surface 600 and the second bottom surface 602 of the temple socket 500 engage the first surface 580 and the second surface 570 respectively of the appendage socket 502. Such engagement and the structure of the depressed first surface 580 allow for greater resistance from horizontal or side-to-side displacement.

In order to release the snap connection, a user presses the button 505, which then pushes out the male portion 640. Except the opening portions defined by the first ridge 610 and the second ridge 620, the female portion 630 has a width slightly greater than that of the head 670, so that once the head 670 passes the second ridge 620 the male portion 640 can freely come out of the female portion 630.

Figure 5:
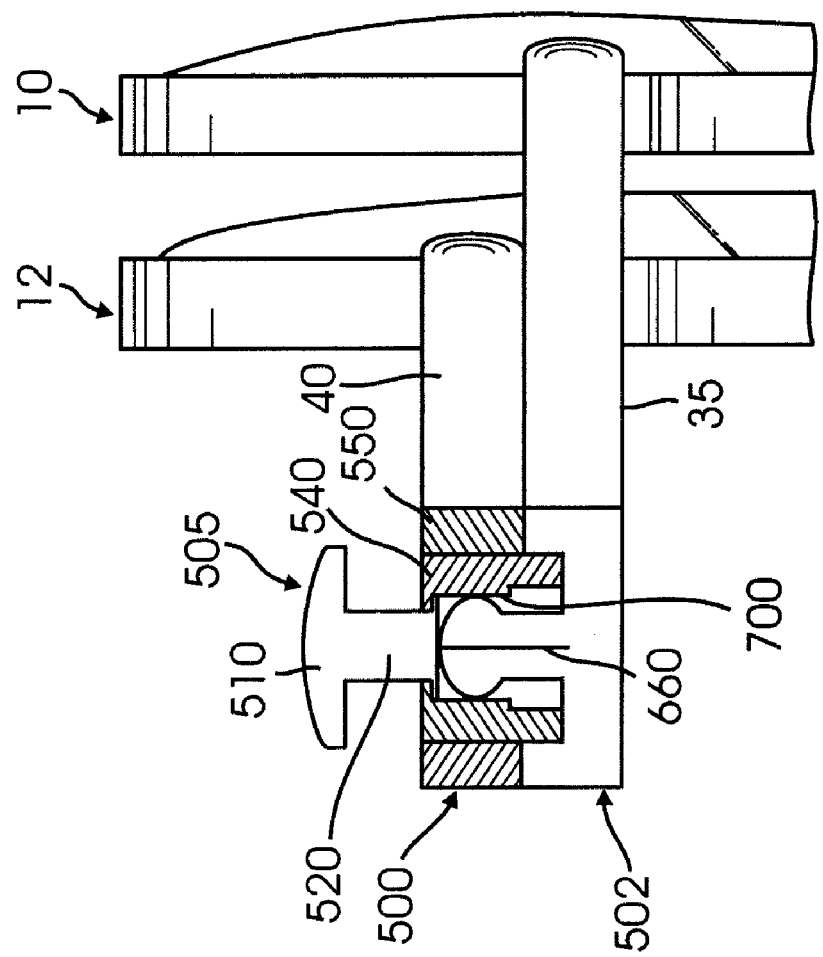
FIG. 5 is a cross-sectional side view of another embodiment of easy release snap connection.
Figure 8:
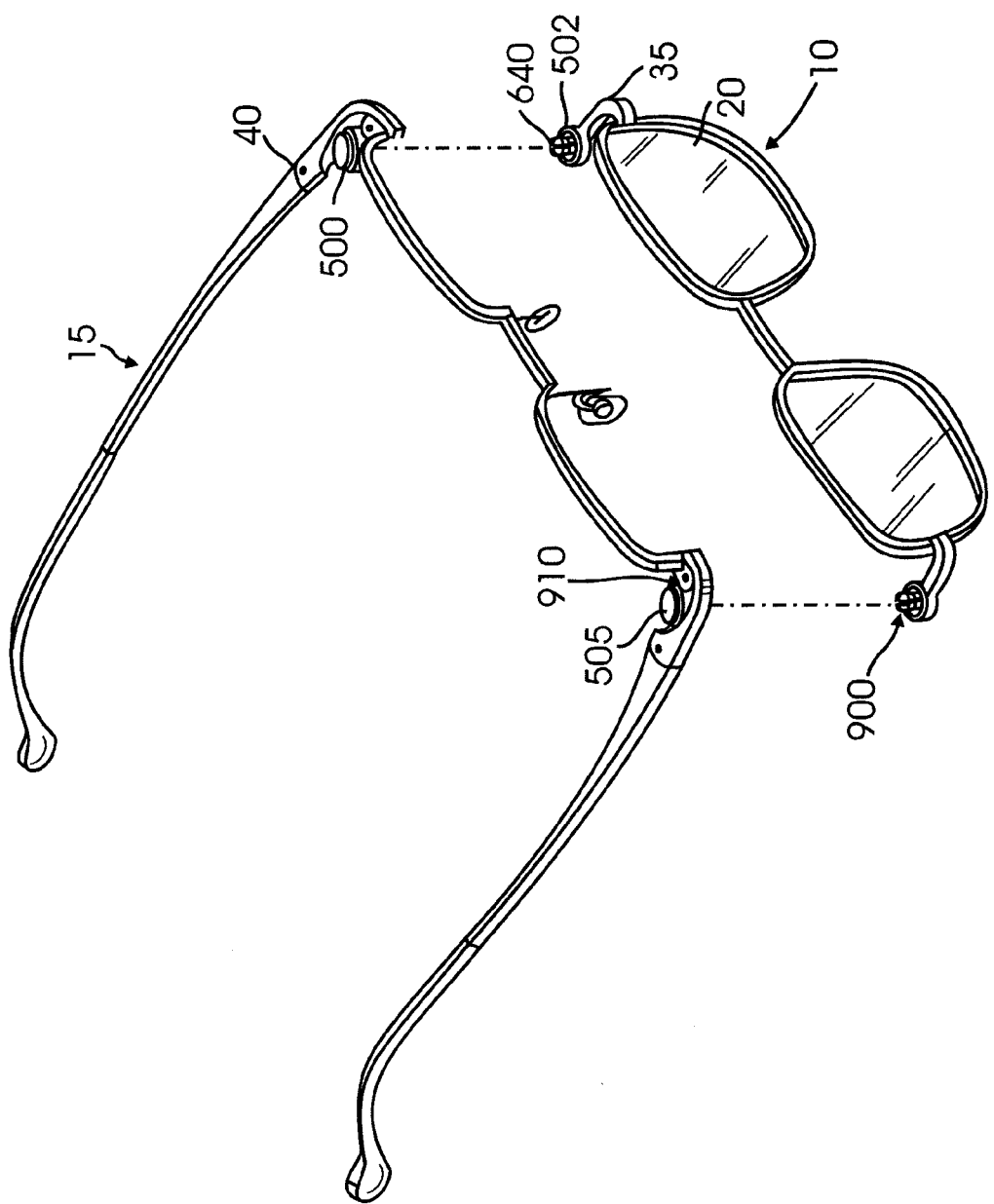
FIG. 8 is an exploded view of another embodiment of a removable lens frame and an eyewear platform with easy release snap connections.

In another embodiment as shown in FIG. 5, the inner wall of the temple socket has a protruding area 700, which is located in a substantially upper portion of the inner wall. Upon insertion of the male portion into the female portion, the head 670 of the male portion frictionally engages the protruding area 700 due to the pressure caused by the resilient property of the compressed head 670 on the surface of the protruding area 700, thereby securely locking the male portion in the female portion.

Figure 2:
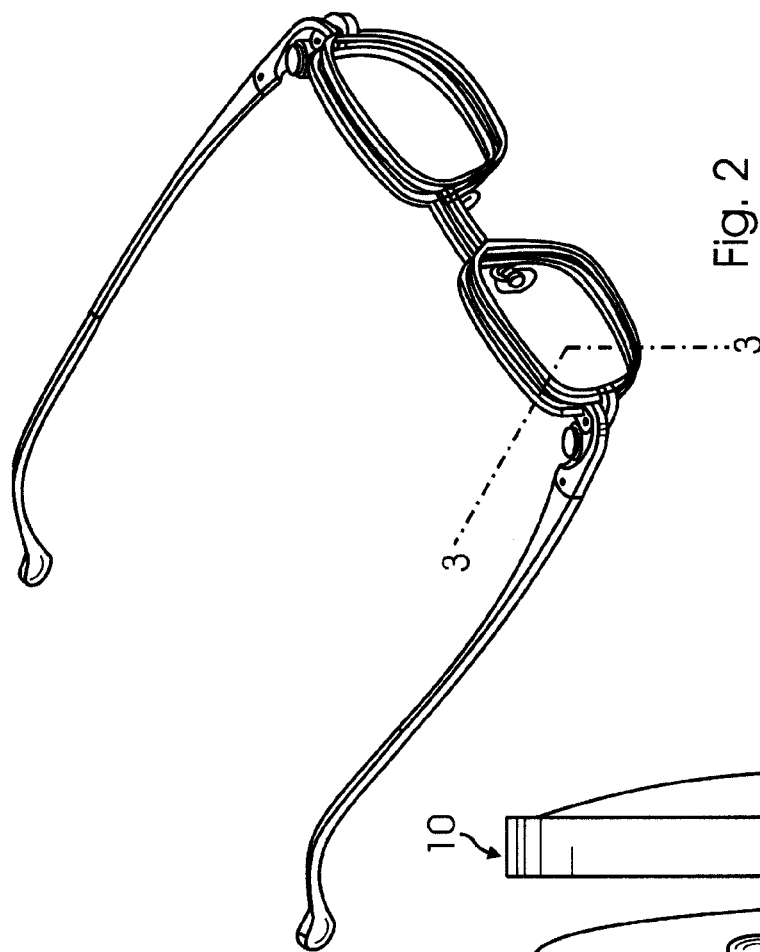
FIG. 2 illustrates the lens frame attached to the conventional eyeglasses by easy release snap connections.
Figure 9:
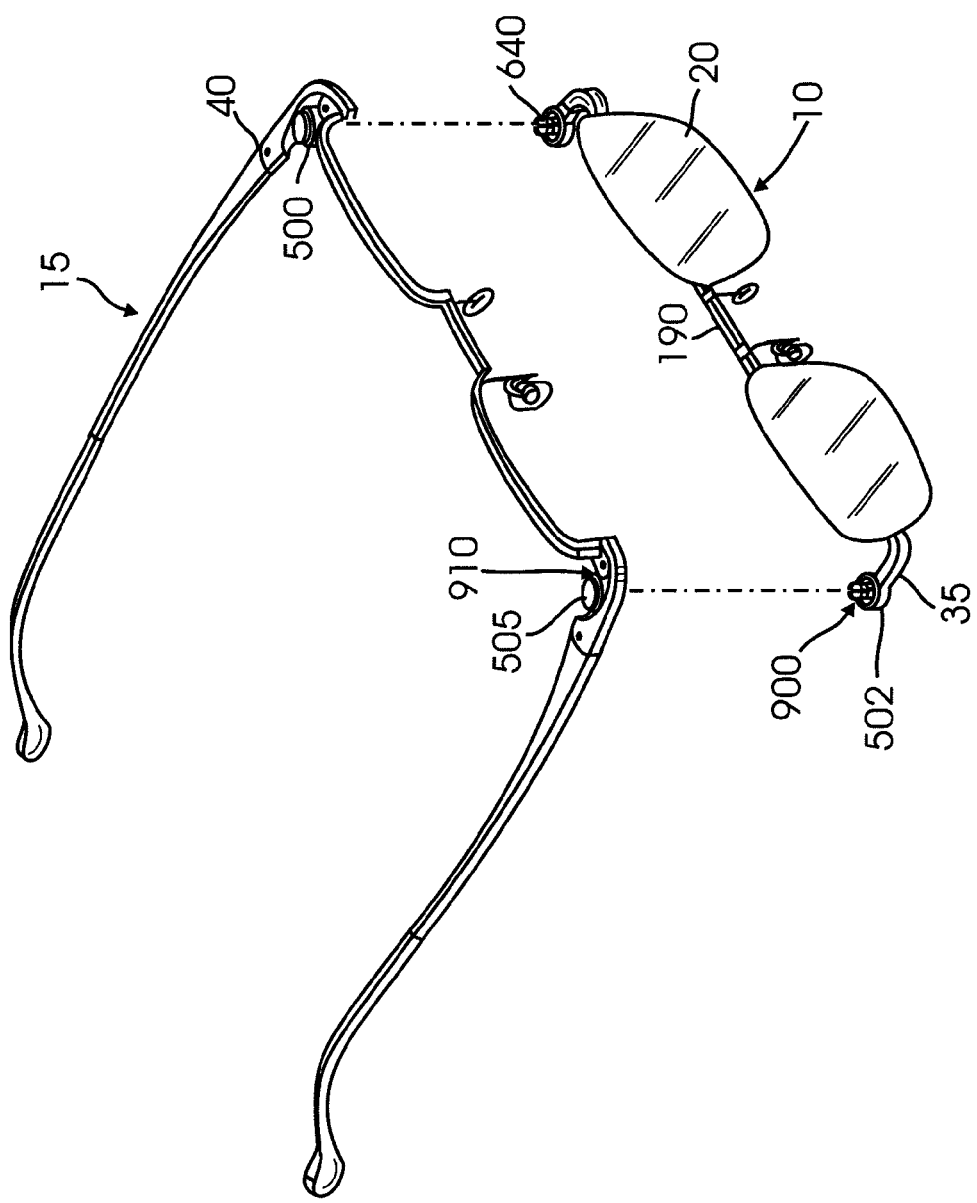
FIG. 9 is an exploded view of another embodiment of a removable lens frame and an eyewear platform with easy release snap connections, where the lenses of the lens frame are connected by a lens connector.

The easy release snap connection can be used for attaching various eyewear frames. For example, a lens frame 10 can be attached by the easy release snap connection to conventional eyeglasses, as shown in FIGS. 1 and 2, or to an eyewear platform 15 as shown in FIGS. 8 through 11. Also, lenses 20 connected by a lens connector 190 can be attached to the eyewear platform 15 by the easy release snap connection as illustrated in FIG. 9.

Figure 10:
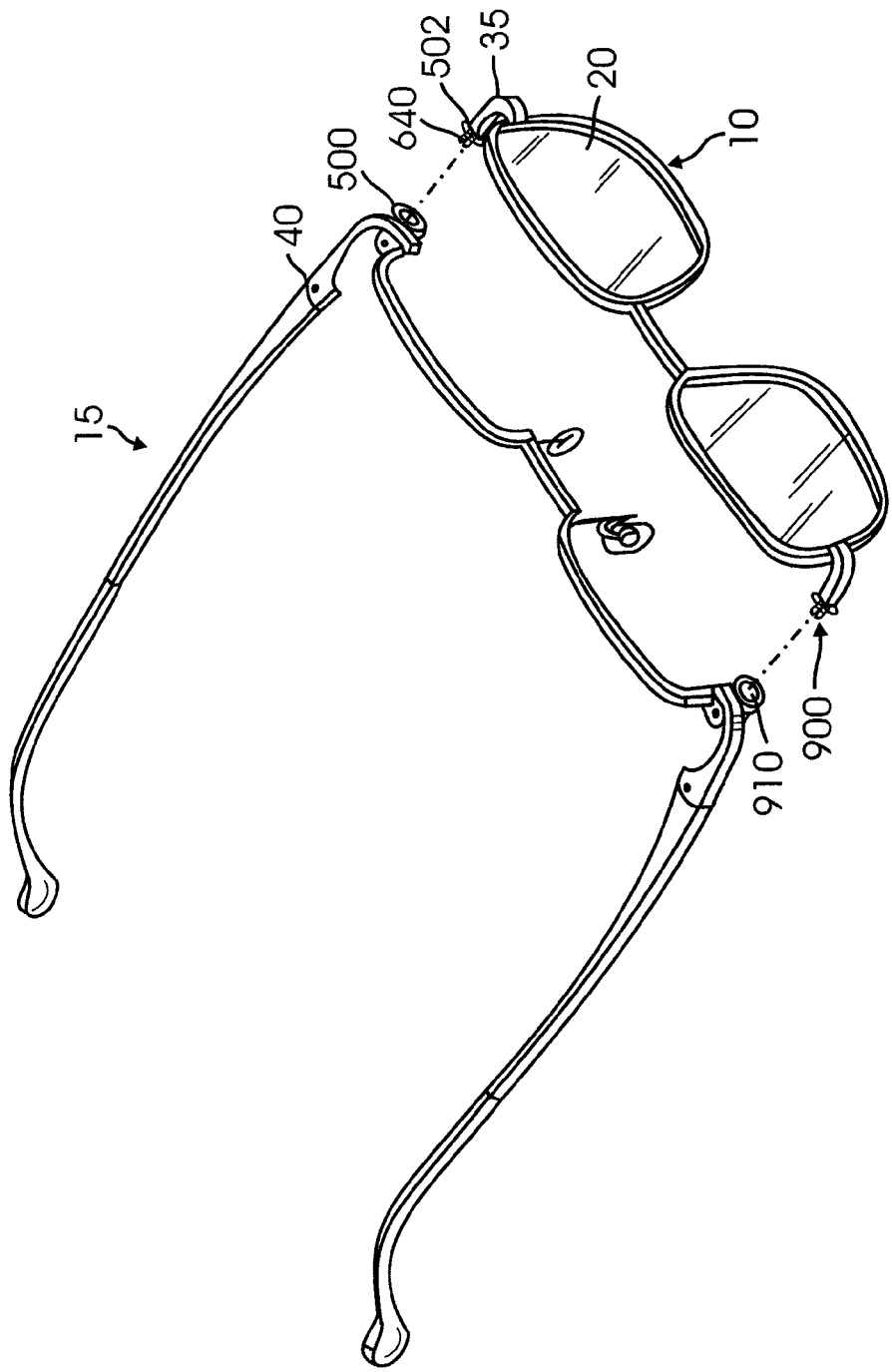
FIG. 10 is an exploded view of another embodiment of a removable lens frame and an eyewear platform with easy release snap connections, where the lens frame is mounted rearwardly from the front.
Figure 11:
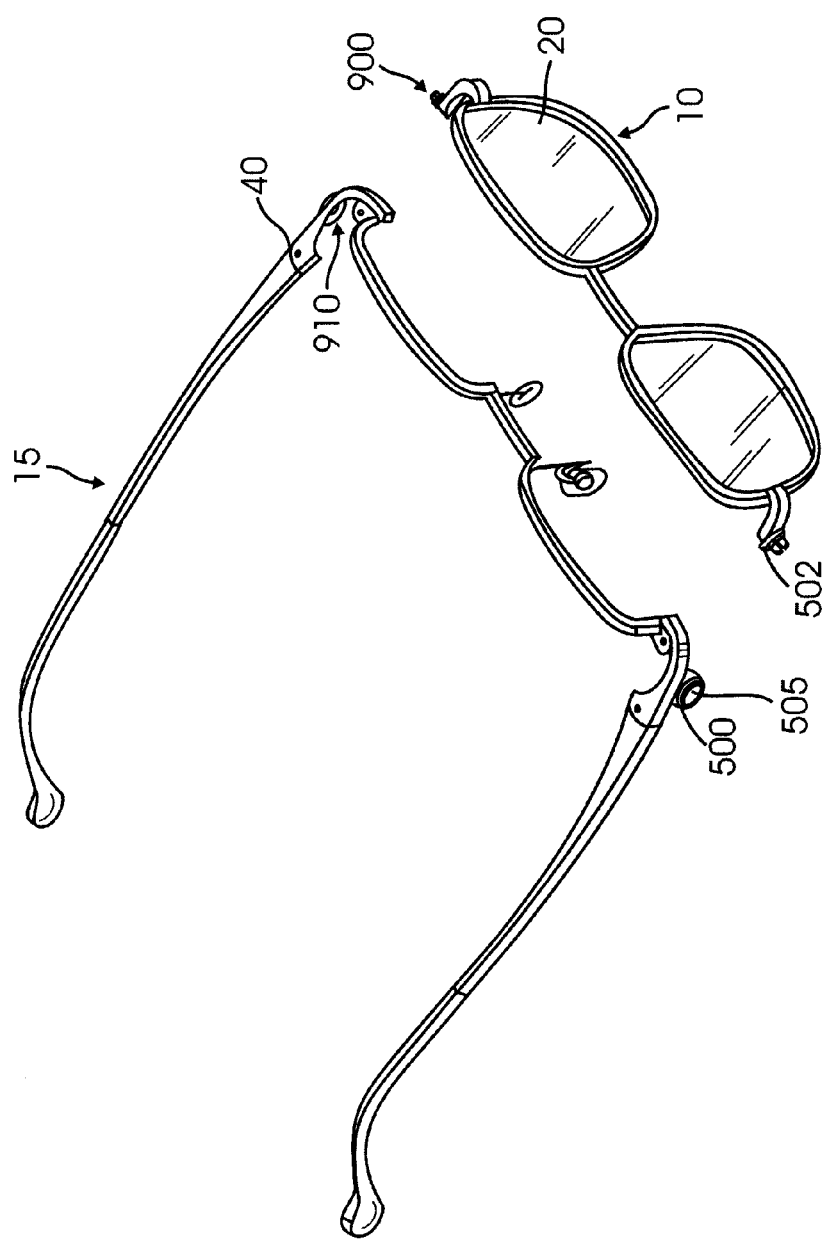
FIG. 11 is an exploded view of another embodiment of a removable lens frame and an eyewear platform with easy release snap connections, where the lens frame is mounted outwardly from the side of each appendage of the lens frame.

The appendage socket 502 can be aligned and mounted in various positions on the lens frame 10, including being mounted horizontally (e.g., FIGS. 1-9) or vertically (e.g., FIGS. 10-11). Alternatively, the male portion 640 can be directly connected to the appendage 35 without the appendage socket.

Similarly, the temple socket 500 can be aligned and mounted in various positions on the temple extension 40, including being mounted horizontally (e.g., FIGS. 1-5, 8-9) or vertically (e.g., FIGS. 10-11). In an alternative, the female portion and the button can be directly constructed in the temple extension 40 without using the temple socket.

Figure 12:
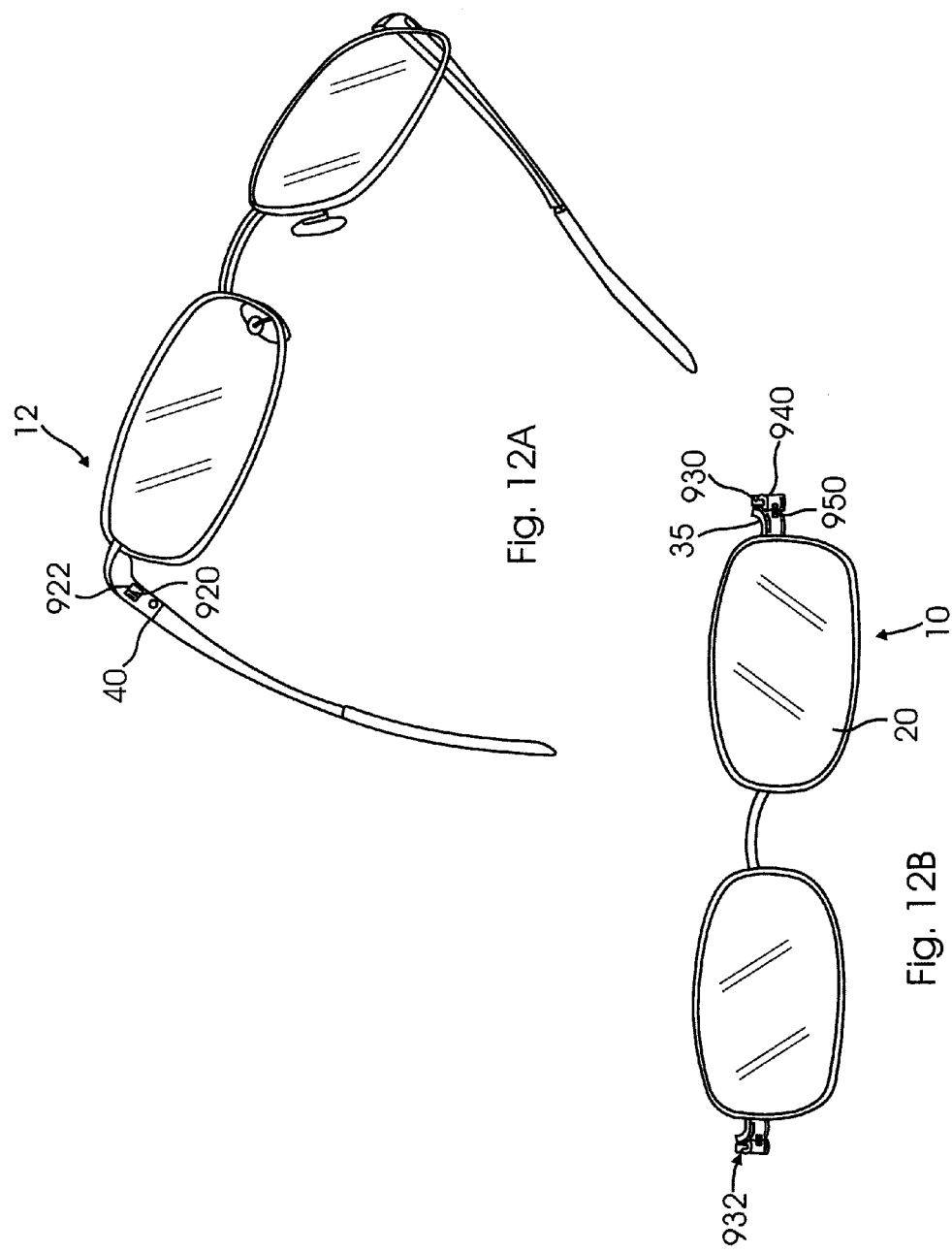
FIG. 12A is a bottom perspective view of a primary eyewear with a female portion of another embodiment of easy release snap connection.
FIG. 12B is a front view of a lens frame with a male portion of another embodiment of easy release snap connection.
Figure 13:
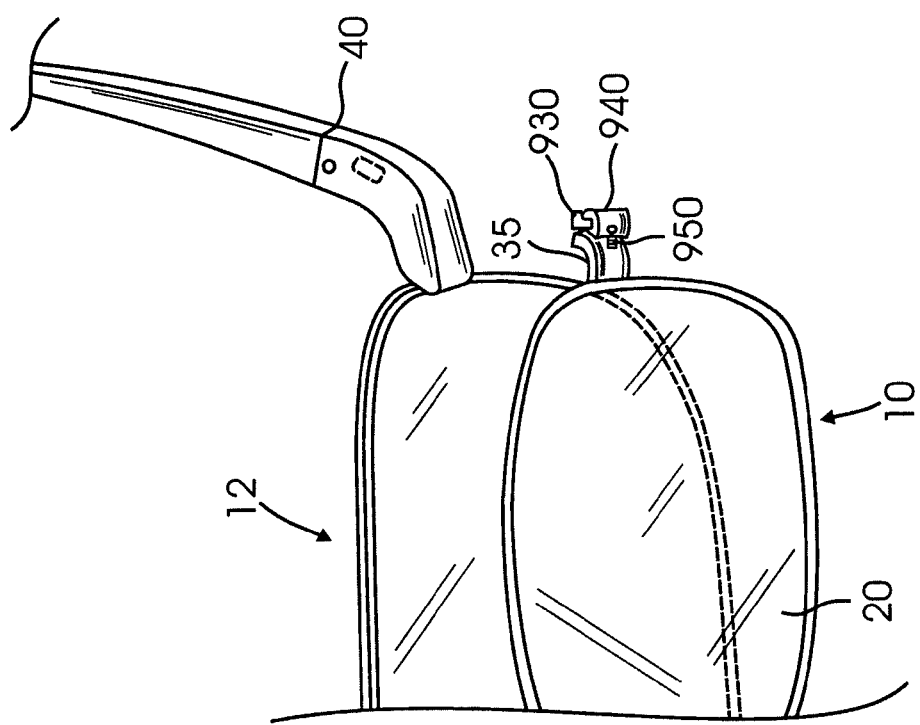
FIG. 13 is a partial exploded view of a removable lens frame and a primary eyewear with the easy release snap connection shown in FIGS. 12A and 12B.
Figure 14:
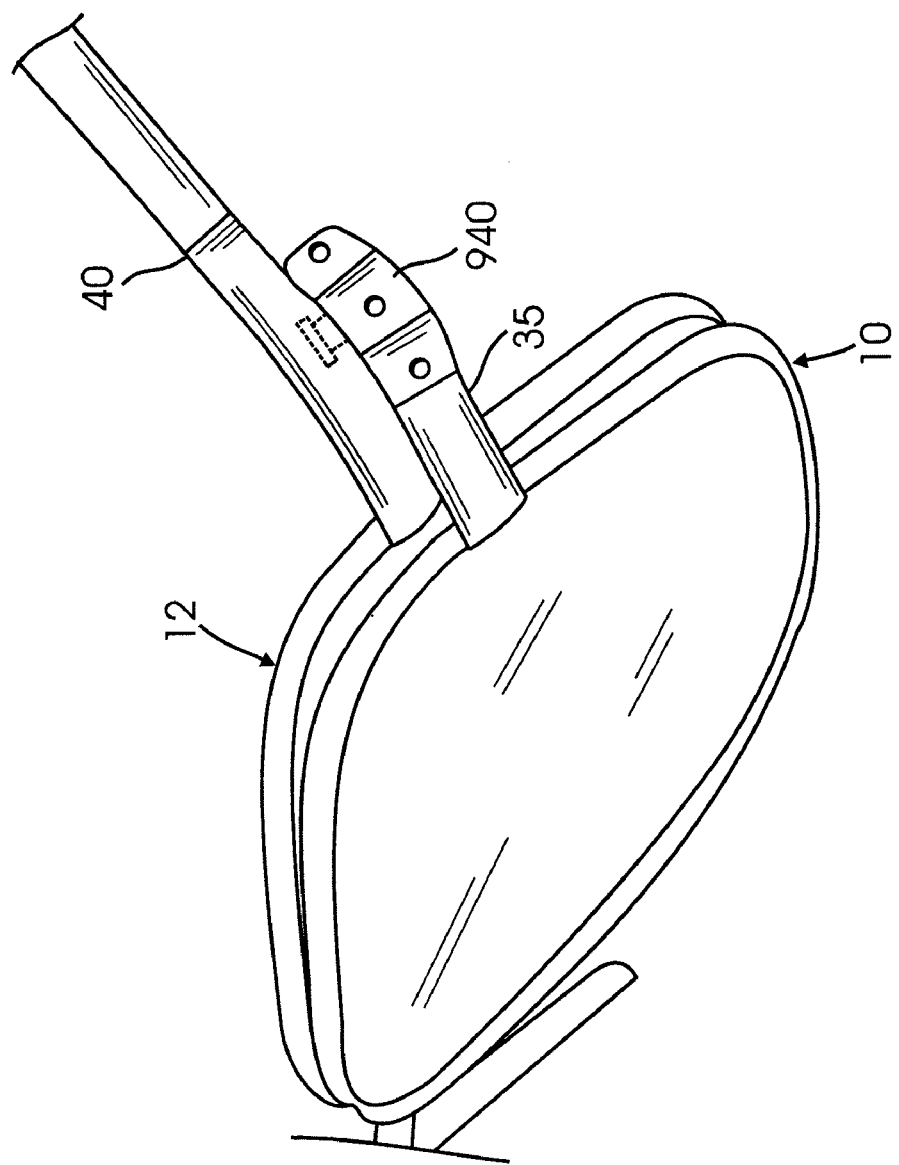
FIG. 14 illustrates the lens frame attached to the primary eyewear by the easy release snap connection shown in FIG. 13.

FIGS. 12A through 16B show another embodiment of easy release snap connection for attaching a lens frame to a primary eyewear. In FIGS. 12A and 12B, a first connector 932 having a male portion 930 is located in a lens frame 10, and a second connector 922 having a female portion 920 is placed in a primary eyewear 12. The first connector 932 further comprises a button 940. The button 940 is connected to each of appendages 35 of the lens frame 10 by a spring member 950 such that the button 940 is capable of being pressed inward toward a lens 20 of the lens frame 10. When the button 940 is released, it returns to its approximate original position due to the resilient force of the spring member 950. The male portion 930 is attached to the button 940 so that the male portion 930 is movable together with the button 940.

Figure 15:
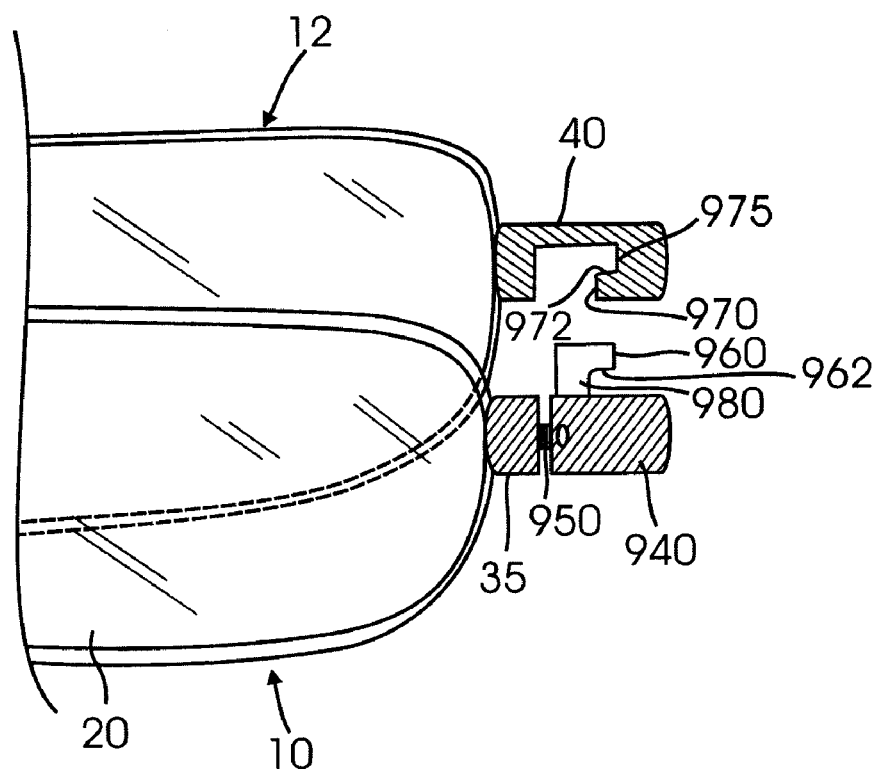
FIG. 15 is a partial cross-sectional front view illustrating the lens frame shown in FIG. 13 detached from the primary eyewear.

The male portion 930 comprises a body 980 and a hook 960 as shown in FIG. 15. The hook 960 protrudes from the body 980 such that the hook 960 is substantially perpendicular to the body 980.

Being configured for receiving the male portion 930, the female portion 920 is located in each of temple extensions 40 of the primary eyewear 12. The female portion 920 is defined by an inner wall 975 and a terminal edge 970 of the second connector 922. The terminal edge 970 protrudes from the inner wall 975 of the second connector so that the part of the female portion defined by the terminal edge 970 is narrower than the part of the female portion defined by the inner wall 975. However, the size of the part of the female portion defined by the terminal edge 970 is at greater than that of the hook 960 of the male portion 930.

Figure 16A:
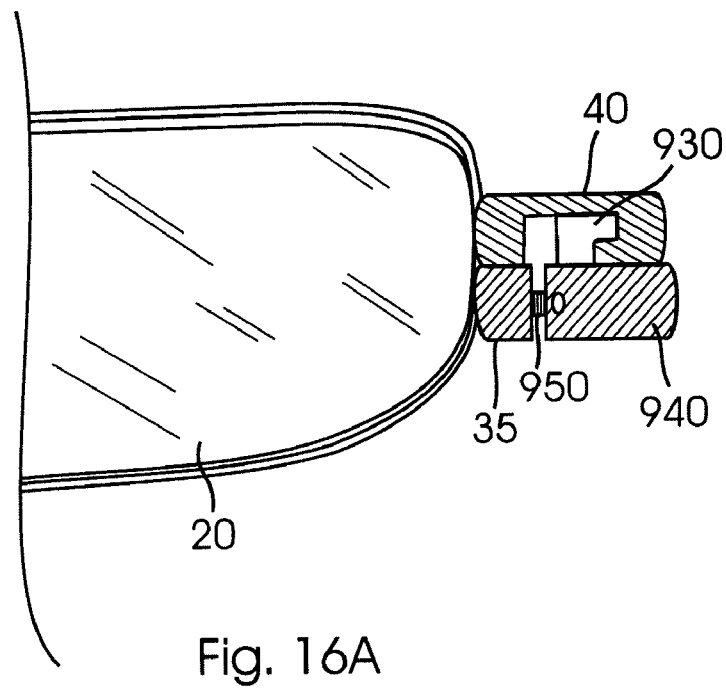
FIG. 16A is a partial cross-sectional front view illustrating the lens frame shown in FIG. 13 attached to the primary eyewear, where a button is not pressed.

When the button 940 is not pressed, the distance between the two male portions connected to appendages of the lens frame 10 is slightly greater than the distance between the two female portions located in temple extensions of the primary eyewear 12. Therefore, in order to insert the male portions into the female portions, a user should press the button 940. Upon pressing the button 940 inward toward the lens 20 of the lens frame 10, the male portion 930 accordingly moves to a position where the male portion 930 can be inserted into the female portion 920. When the user inserts the male portion 930 while pressing the button 940, the male portion 930 passes the terminal edge 970. Upon releasing the button 940, the male portion 930 returns to its original distance due to the resilient force of the spring member 950. As a result, the body 980 of the male portion 930 frictionally engages the terminal edge 970, thereby the male portion 930 being securely locked in the female portion 920. Further, as shown in FIG. 16A, a bottom surface 962 of the hook 960 of the male portion 930 may engage a top surface 972 of the terminal edge 970. Such structure gives additional stability, especially when the lens frame 10 is mounted from below onto the primary eyewear 12 as shown in FIG. 16A, because the hook 960 of the male portion 930 is supported by the terminal edge 970 against the gravity. In addition, the inner wall 975 can also be configured to engage at least a part of the hook 960 of the male portion 930 as shown in FIG. 16A.

Figure 16B:
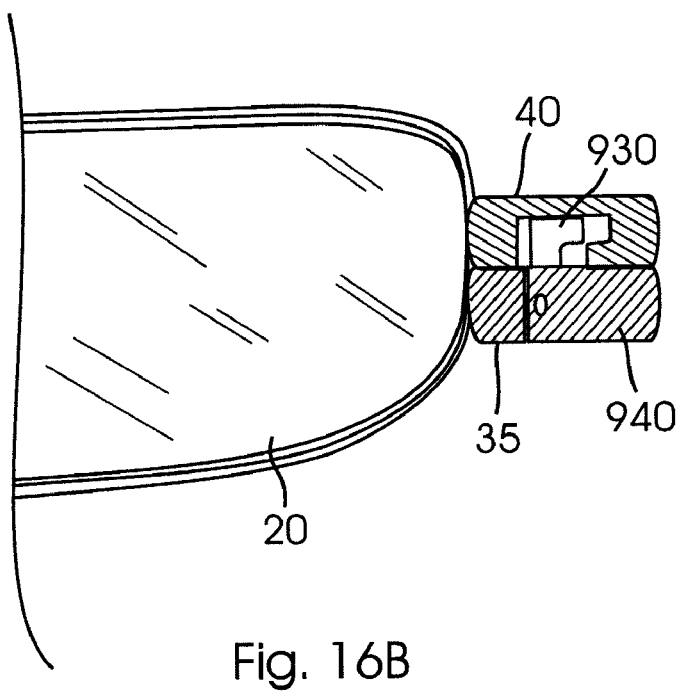
FIG. 16B is a partial cross-sectional front view of the easy release snap connection shown in FIG. 13, where the button is pressed.

In order to release the male portion 930 from the female portion 920, the user presses the button 940, as shown in FIG. 16B, to move the male portion 930 to a position where the male portion is released from the engagement with the terminal edge 970.

The side-spring easy release snap connection shown in FIGS. 12A through 16B can be applied to various eyewear frames. For example, a lens frame 10 can be attached by the side-spring easy release snap connection to conventional eyeglasses or to an eyewear platform 15. Also, lenses 20 connected by a lens connector 190 can be attached to the eyewear platform 15 by the side-spring easy release snap connection.

Although in an embodiment illustrated in FIGS. 12A through 16B the male portion 930 is located in the lens frame 10 and the female portion 920 located in the primary eyewear 12, in another embodiment, the male portion of the side-spring easy release snap connection can be located in the primary eyewear and the female portion in the lens frame.

Finally, the primary eyewear and the lens frame including the first connector and the second connector can be made of a variety of materials including but not limited to metals, alloys, carbon fibers, plastics and other lightweight and strong composite materials. In addition, the primary eyewear and the lens frame can also be made of materials that allow a certain amount of resilience, elasticity, or "give" to enable the eyewear to be able to take the rigors of use. Both the primary eyewear and the lens frame can assume a variety of shapes and sizes depending on the specific design or need of the user. Also, both the primary eyewear and the lens frame can be each made of one piece.

While the invention as described in connection with its preferred embodiments, it will be understood that it is not intended to limit the invention to those embodiments. On the contrary, it is intended to cover all alternatives, modifications, and equivalents as may be included within the spirit and scope of the invention as defined by the appended claims.

What is claimed is:

1. An apparatus for attaching a lens frame to a primary eyewear comprising:
   a first connector comprising a male portion;
   a second connector comprising a female portion, the female portion being configured for receiving the male portion, the male portion and the female portion being located in the lens frame and the primary eyewear such that the lens frame is attached to the primary eyewear by inserting the male portion into the female portion in proximity to each of temple extensions of the primary eyewear; and
   a button capable of releasing the male portion from the female portion.

2. The apparatus of claim 1, wherein the button is connected to each of appendages of the lens frame by a spring member.

3. The apparatus of claim 2, wherein the male portion is attached to the button so that the male portion is movable with the button.

4. The apparatus of claim 3, wherein the female portion is located in each of the temple extensions of the primary eyewear.

5. The apparatus of claim 4, wherein the female portion is defined by an inner wall and a terminal edge of the second connector, the terminal edge protruding from the inner wall of the second connector.

6. The apparatus of claim 5, wherein the male portion comprises a body and a hook, the hook protruding from the body such that, upon pressing the button inward toward a lens of the lens frame to insert the male portion into the female portion, the hook passes the terminal edge and, upon releasing the button, the body of the male portion frictionally engages the terminal edge for securely locking the male portion in the female portion.

7. The apparatus of claim 5, wherein the male portion comprises a body and a hook, the hook protruding from the body such that, upon pressing the button inward toward a lens of the lens frame to insert the male portion into the female portion, the hook passes the terminal edge and, upon releasing the button, a bottom surface of the hook of the male portion engages a top surface of the terminal edge for securely locking the male portion in the female portion.

8. The apparatus of claim 5, wherein the male portion comprises a body and a hook, the hook protruding from the body such that, upon pressing the button inward toward a lens of the lens frame to insert the male portion into the female portion, the hook passes the terminal edge and, upon releasing the button, at least a part of the hook of the male portion engages the inner wall for securely locking the male portion in the female portion.

9. An apparatus for attaching a lens frame to a primary eyewear comprising:
   a first connector comprising a male portion, a button, and a spring member, the male portion and the button being movable together in the same direction by the spring member; and
   a second connector comprising a female portion, the female portion being configured for receiving the male portion, the male portion and the female portion being located in the lens frame and the primary eyewear such that the lens frame is attached to the primary eyewear by inserting the male portion into the female portion.

10. The apparatus of claim 9, wherein the button is connected to each of appendages of the lens frame by the spring member.

11. The apparatus of claim 10, wherein the male portion is attached to the button.

12. The apparatus of claim 11, wherein the female portion is located in each of temple extensions of the primary eyewear.

13. The apparatus of claim 12, wherein the female portion is defined by an inner wall and a terminal edge of the second connector, the terminal edge protruding from the inner wall of the second connector.

14. The apparatus of claim 13, wherein the male portion comprises a body and a hook, the hook protruding from the body such that, upon pressing the button inward toward a lens of the lens frame to insert the male portion into the female portion, the hook passes the terminal edge and, upon releasing the button, the body of the male portion frictionally engages the terminal edge for securely locking the male portion in the female portion.

15. The apparatus of claim 13, wherein the male portion comprises a body and a hook, the hook protruding from the body such that, upon pressing the button inward toward a lens of the lens frame to insert the male portion into the female portion, the hook passes the terminal edge and, upon releasing the button, a bottom surface of the hook of the male portion engages a top surface of the terminal edge for securely locking the male portion in the female portion.

16. The apparatus of claim 13, wherein the male portion comprises a body and a hook, the hook protruding from the body such that, upon pressing the button inward toward a lens of the lens frame to insert the male portion into the female portion, the hook passes the terminal edge and, upon releasing the button, at least a part of the hook of the male portion engages the inner wall for securely locking the male portion in the female portion.

17. An apparatus for attaching a lens frame to a primary eyewear comprising:
   a primary eyewear and a lens frame,
   the primary eyewear having two temple extensions capable of being placed over a user's ears and a bridge portion capable of resting on a user's nose to permit the primary eyewear to be worn by a user,
   the lens frame comprising at least one lens,
   the lens frame having a first connector, the first connector comprising a male portion and a button, the male portion being attached to the button, the button being connected to each of appendages of the lens frame by a spring member,
   the primary eyewear having a second connector having a female portion being located so as to be capable of receiving the male portion.

18. The apparatus of claim 17, wherein the female portion is located in each of the temple extensions of the primary eyewear, the female portion being defined by an inner wall and a terminal edge of the second connector, the terminal edge protruding from the inner wall of the second connector.

19. The apparatus of claim 18, wherein the male portion comprises a body and a hook, the hook protruding from the body such that, upon pressing the button inward toward the lens of the lens frame to insert the male portion into the female portion, the hook passes the terminal edge and, upon releasing the button, the body of the male portion frictionally engages the terminal edge for securely locking the male portion in the female portion.

20. The apparatus of claim 18, wherein the male portion comprises a body and a hook, the hook protruding from the body such that, upon pressing the button inward toward the lens of the lens frame to insert the male portion into the female portion, the hook passes the terminal edge and, upon releasing the button, a bottom surface of the hook of the male portion engages a top surface of the terminal edge for securely locking the male portion in the female portion.

* * * * *